United States Patent
Tshering et al.

(10) Patent No.: US 10,877,177 B2
(45) Date of Patent: Dec. 29, 2020

(54) OBTAINING LONG-PERIOD MAGNETOTELLURIC MARINE SURVEY DATA USING A TOWED STREAMER SYSTEM

(71) Applicant: PGS Geophysical AS, Oslo (NO)

(72) Inventors: Tashi Tshering, Oslo (NO); Allan McKay, Borgen (NO)

(73) Assignee: PGS Geophysical AS, Oslo (NO)

( * ) Notice: Subject to any disclaimer, the term of this patent is extended or adjusted under 35 U.S.C. 154(b) by 92 days.

(21) Appl. No.: 16/202,641

(22) Filed: Nov. 28, 2018

(65) Prior Publication Data

US 2019/0187322 A1    Jun. 20, 2019

Related U.S. Application Data

(60) Provisional application No. 62/599,957, filed on Dec. 18, 2017.

(51) Int. Cl.
*G01V 3/36* (2006.01)
*G01V 3/40* (2006.01)
(Continued)

(52) U.S. Cl.
CPC ............... *G01V 3/36* (2013.01); *G01V 3/165* (2013.01); *G01V 3/17* (2013.01); *G01V 3/40* (2013.01); *G06F 16/2228* (2019.01)

(58) Field of Classification Search
CPC . G01V 3/36; G01V 3/165; G01V 3/40; G01V 3/17; G06F 16/2228
See application file for complete search history.

(56) References Cited

U.S. PATENT DOCUMENTS 6,950,747 B2    9/2005   Byerly
7,400,977 B2    7/2008   Alumbaugh et al.
(Continued)

OTHER PUBLICATIONS

Brodic, et al., "Multi-component digital-based seismic landstreamer and boat-towed radio-magnetotelluric acquisition systems for improved subsurface characterization in the urban environment," ResearchGate, First Break, vol. 35, Aug. 2017, 8 pages.
(Continued)

*Primary Examiner* — Dominic E Hawkins

(57) ABSTRACT

Techniques are disclosed for generating a time series representation of passive electromagnetic (EM) fields via towed streamer measurements without dependence on water-bottom measurement equipment. Such techniques may include storing records of respective time series measurements of passive EM fields measured by individual receivers as the individual receivers pass over a first measurement point, where the respective time series measurements correspond to respective measurement intervals, and where the respective time series measurements are synchronized with respect to a reference clock. The records of the respective time series measurements may be combined to generate a time series representation of passive EM fields observed at the first measurement point over a combination of the respective measurement intervals. The time series representation of passive EM fields observed at the first measurement point may, in turn, be used to identify one or more characteristics of subsurface structure.

27 Claims, 8 Drawing Sheets

(51) Int. Cl.
*G01V 3/165* (2006.01)
*G06F 16/22* (2019.01)
*G01V 3/17* (2006.01)

(56) References Cited

U.S. PATENT DOCUMENTS

| | | | |
|---|---|---|---|
| 7,912,649 B2 | 3/2011 | Harris et al. | |
| 8,169,222 B2 | 5/2012 | Hornbostel et al. | |
| 8,347,658 B2 | 1/2013 | Thompson et al. | |
| 8,873,334 B2 | 10/2014 | Thompson et al. | |
| 2009/0140741 A1* | 6/2009 | Tenghamn | G01V 3/12 324/347 |
| 2011/0273179 A1* | 11/2011 | Sudow | G01V 3/12 324/334 |
| 2012/0293177 A1* | 11/2012 | Dodds | G01V 3/17 324/331 |
| 2013/0010571 A1* | 1/2013 | Sudow | B63B 21/66 367/16 |
| 2013/0272090 A1* | 10/2013 | Peppe | G01V 11/00 367/17 |
| 2013/0286776 A1* | 10/2013 | Renaud | G01V 1/26 367/23 |
| 2014/0069313 A1* | 3/2014 | Nielsen | G01V 13/00 114/244 |
| 2015/0073715 A1* | 3/2015 | Aarre | G01V 1/345 702/14 |
| 2015/0086299 A1* | 3/2015 | Jamieson | B63C 7/20 414/139.6 |
| 2015/0121124 A1* | 4/2015 | Hillesund | G01V 3/17 714/5.1 |
| 2016/0178781 A1* | 6/2016 | Haber | G01V 3/16 324/326 |
| 2016/0375963 A1* | 12/2016 | Tonnessen | G01V 1/38 701/21 |

OTHER PUBLICATIONS

Bastani, et al., "Case History: Boat-towed radio-magnetotellurics—A new technique and case study from the city of Stockholm," Geophysics, vol. 80, No. 6 (Nov.-Dec. 2015), pp. B193-B202, 8 Figs.

Malehmir, et al. "Multicomponent digital-based seismic landstreamer and boat-towed RMT systems for urban underground infrastructure planning," SBUF 13223, Compiled by Alireza Malehmir, Jan. 2017, 37 pages.

Johan Mattsson, et al., "Noise reduction and error analysis for a Towed EM System," 2012 SEG Annual Meeting, Nov. 4-9, 4 pages.

* cited by examiner

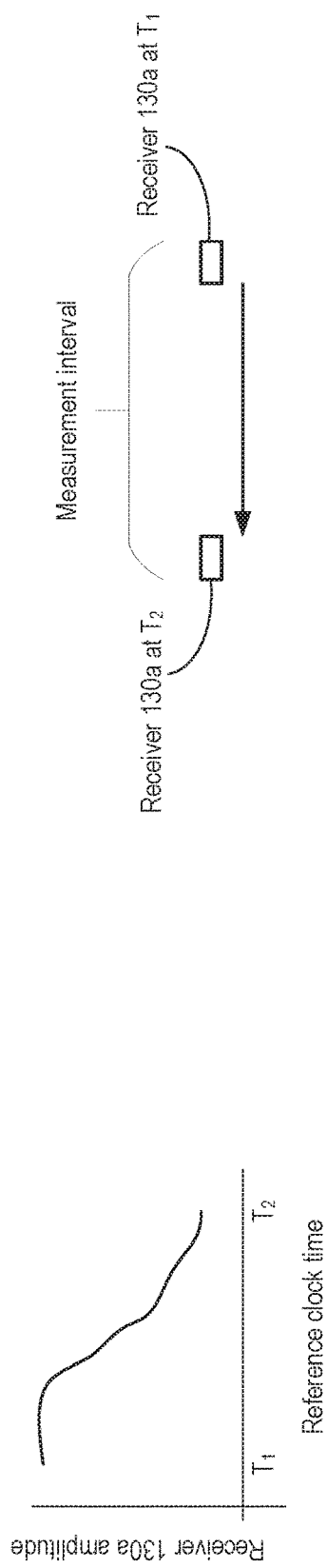
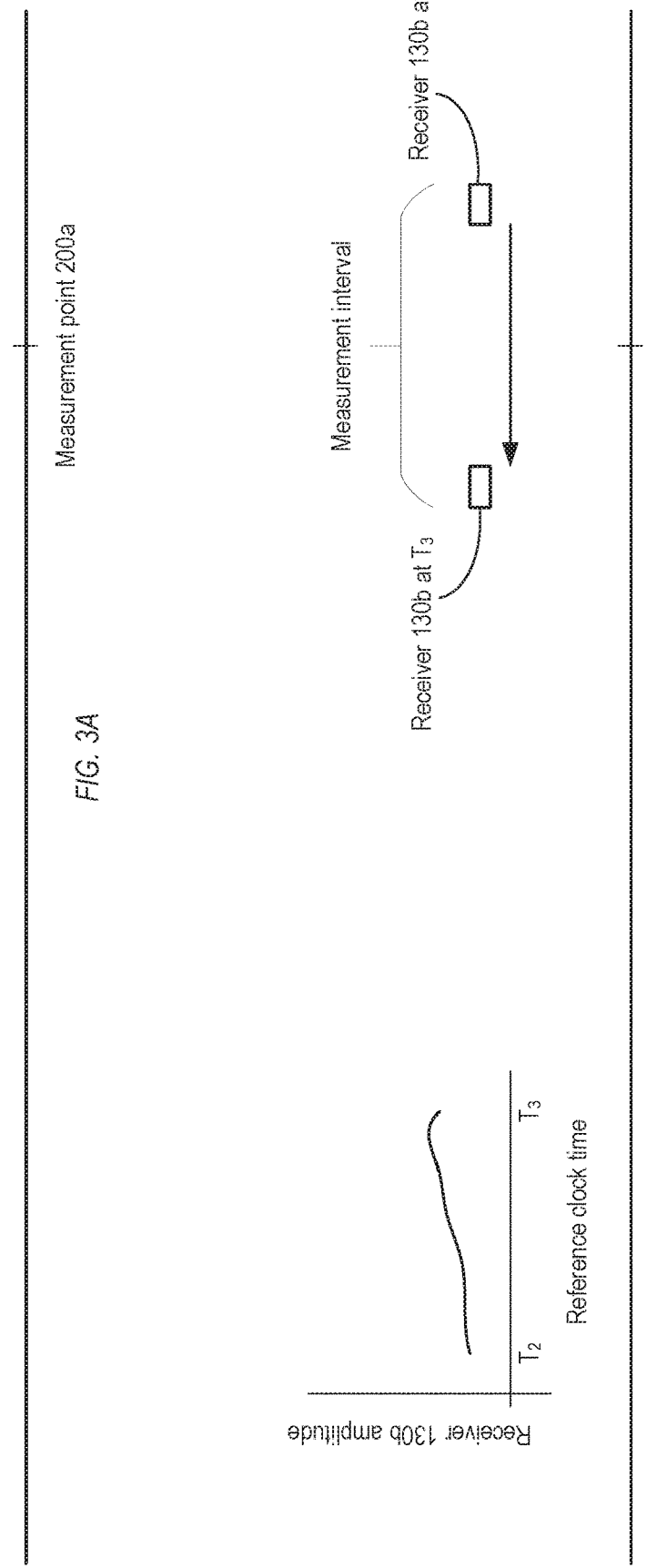
FIG. 3A
FIG. 3B

OBTAINING LONG-PERIOD MAGNETOTELLURIC MARINE SURVEY DATA USING A TOWED STREAMER SYSTEM

CROSS-REFERENCE TO RELATED APPLICATIONS

This application claims priority to U.S. Provisional Patent Application No. 62/599,957, filed on Dec. 18, 2017, which is hereby incorporated by reference in its entirety.

BACKGROUND

Geophysical surveys are often used for oil and gas exploration in geophysical formations, which may be located below marine environments. Various types of signal sources and geophysical sensors may be used in different types of geophysical surveys. Seismic geophysical surveys, for example, are based on the use of seismic waves. Electromagnetic (EM) geophysical surveys, as another example, are based on the use of electromagnetic waves. In some surveys, a survey vessel may tow one or more sources (e.g., air guns, marine vibrators, electromagnetic sources, etc.) and one or more streamers along which a number of sensors (e.g., hydrophones and/or geophones and/or electromagnetic sensors) are located.

One particular survey technique involves detection of passive EM fields, for example, by measuring the variation in the natural geomagnetic and/or geoelectric fields of the Earth, and using this information to generate inferences regarding sub-surface geology in the region in which the passive EM fields are measured. This type of survey may also be referred to as a magnetotelluric (MT) survey. In a marine environment, typical MT surveys require the installation of sensing equipment on the water bottom, which is then left in place until the survey is complete. This approach can be costly and inflexible, however, in terms of the time and effort required to manually deploy and retrieve the water-bottom equipment over each region in which MT data collection is desired.

BRIEF DESCRIPTION OF THE DRAWINGS

FIG. 3A-B show different receivers passing over a measurement point during different measurement intervals.

DETAILED DESCRIPTION

Figure 1:
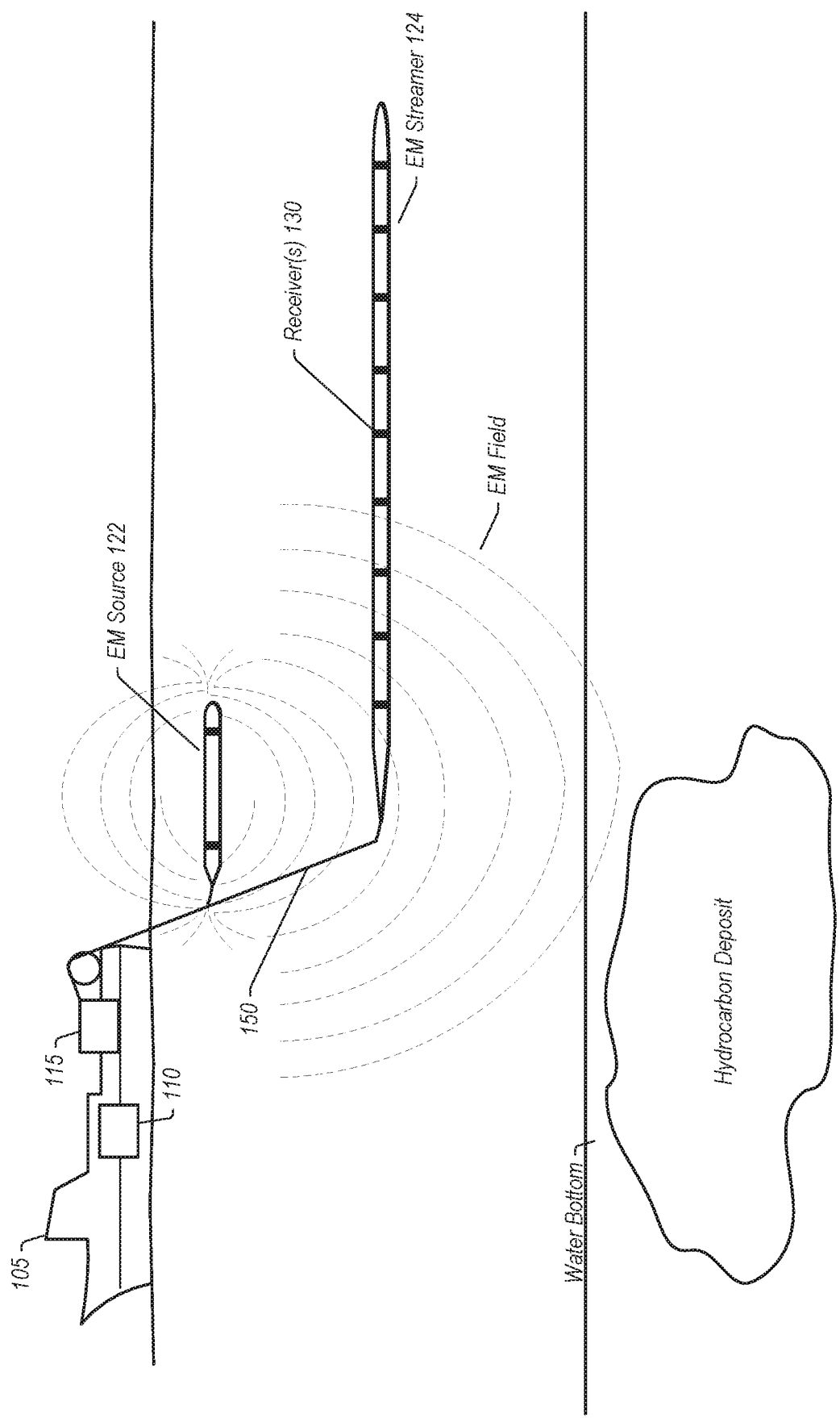
FIG. 1 shows an embodiment of a marine electromagnetic geophysical survey system.

This disclosure initially describes, with reference to FIG. 1, an overview of a geophysical survey system. With reference to FIGS. 2-8, it then describes examples of techniques for using a towed streamer system to obtain long-period data of passive electromagnetic fields, either alone or in combination with active EM surveying. Finally, an example computing system is described with reference to FIG. 9.

Survey Overview

Passive electromagnetic (EM) signals form the basis of measurement for one type of geophysical survey, referred to as the magnetotelluric (MT) survey. The electromagnetic fields measured during an MT survey typically vary extremely slowly by comparison to the EM fields measured in an active-source EM survey or the acoustic fields measured in a seismic survey. For example, a significant majority of the energy of the passive EM fields measured in an MT survey may occur at frequencies below 1 Hz. Correspondingly, longer measurement times may be required to obtain usable MT survey data, e.g., on the order of hours as opposed to seconds or milliseconds as with other survey techniques. Furthermore, longer period (lower frequency) measurements permit greater depths of investigation.

As noted above, one technique for obtaining MT survey data is to distribute sensing equipment along the water bottom to collect measurements. Compared to towed streamer surveys, however, deploying water-bottom equipment requires considerably more time and effort to obtain survey coverage of a given region. Using the techniques described below, MT data may be acquired using a towed EM streamer, either during a dedicated MT survey or in combination with an active-source EM survey. As a result, gathering measurements of passive EM fields may be accomplished without dependence on water-bottom measurement equipment, and (in some embodiments) in conjunction with performing an active EM survey. In turn, this may reduce the time and/or cost associated with performing an MT survey, for example by enabling the use of active EM survey equipment for performing an MT survey instead of requiring separate water-bottom equipment dedicated to the MT survey.

FIG. 1 illustrates (not necessarily to scale) an embodiment of an EM geophysical survey system 100 that may be configured for performing an MT survey as discussed below. In the embodiment shown, a tow vessel 105 on the surface of a body of water (e.g., an ocean, a sea, a lake, etc.) is towing EM source 122 and EM streamer 124. EM source 122 in the illustrated embodiment is coupled to tow vessel 105 via a tow cable 150. Tow vessel 105 includes a power source 115 configured to energize EM source 122. Tow vessel 105 also includes a recording system 110 configured to record survey data.

When conducting an active EM survey, EM source 122 may generate an EM field via a source signal output therefrom. Various types of source signals may be used, and may include sinusoidal waves or other types of waveforms at various frequencies. Either active EM fields resulting from activation of EM source 122, passive EM fields, or a combination of the two may be measured by a plurality of receivers 130 distributed along the length of EM streamer 124, e.g., as electric potential differences in electrode pairs within receivers 130.

The raw time-series data detected by receivers 130 may be conveyed to recording system 110 on survey vessel 105, which in turn may generate records of the data. It is noted that as used herein, a "record" of data refers to a representation of data that is stored or otherwise embodied in a physical medium. Physical media may include, by way of non-limiting example, persistent storage devices such as magnetic or optical nonvolatile media, various types of computer system memory, and other types of non-transitory computer-readable media as discussed below. Typically, the raw time-series survey data needs further analysis in order to generate a model or image corresponding to the sub-sea structure that reveals the estimated locations of geological features of interest. For example, a suitable inversion procedure may be applied to the time-series data in order to generate a subsurface resistivity profile (e.g., a representation that illustrates variations in resistivity according to subsurface depth, which may in turn facilitate the location of particular subsurface structural features such as hydrocarbon deposits).

Passive EM Survey Techniques

Figure 2:
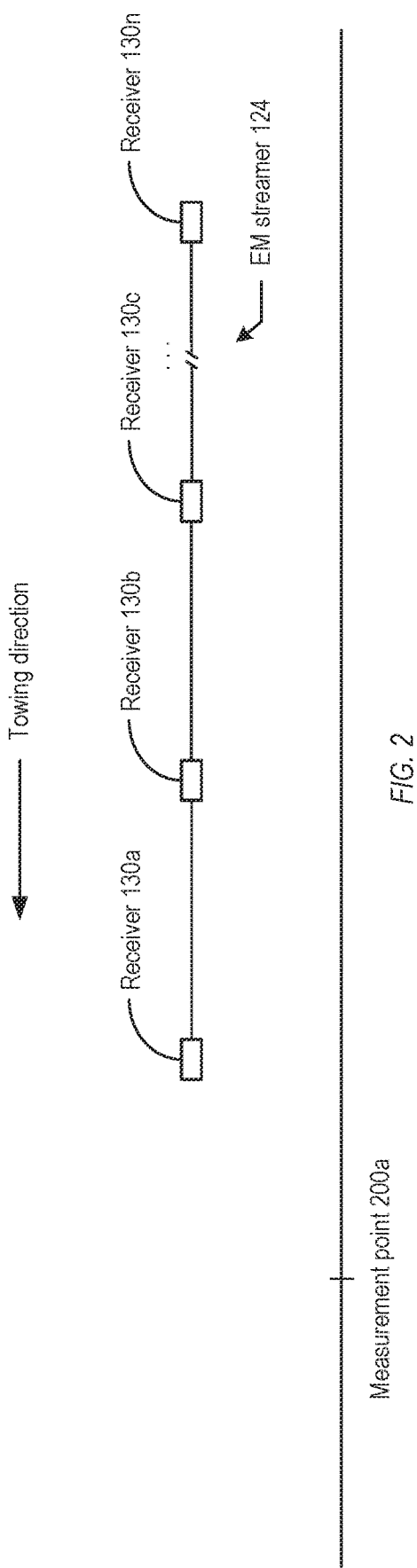
FIG. 2 is a schematic representation of an EM streamer in profile with respect to a measurement point.
Figure 4:
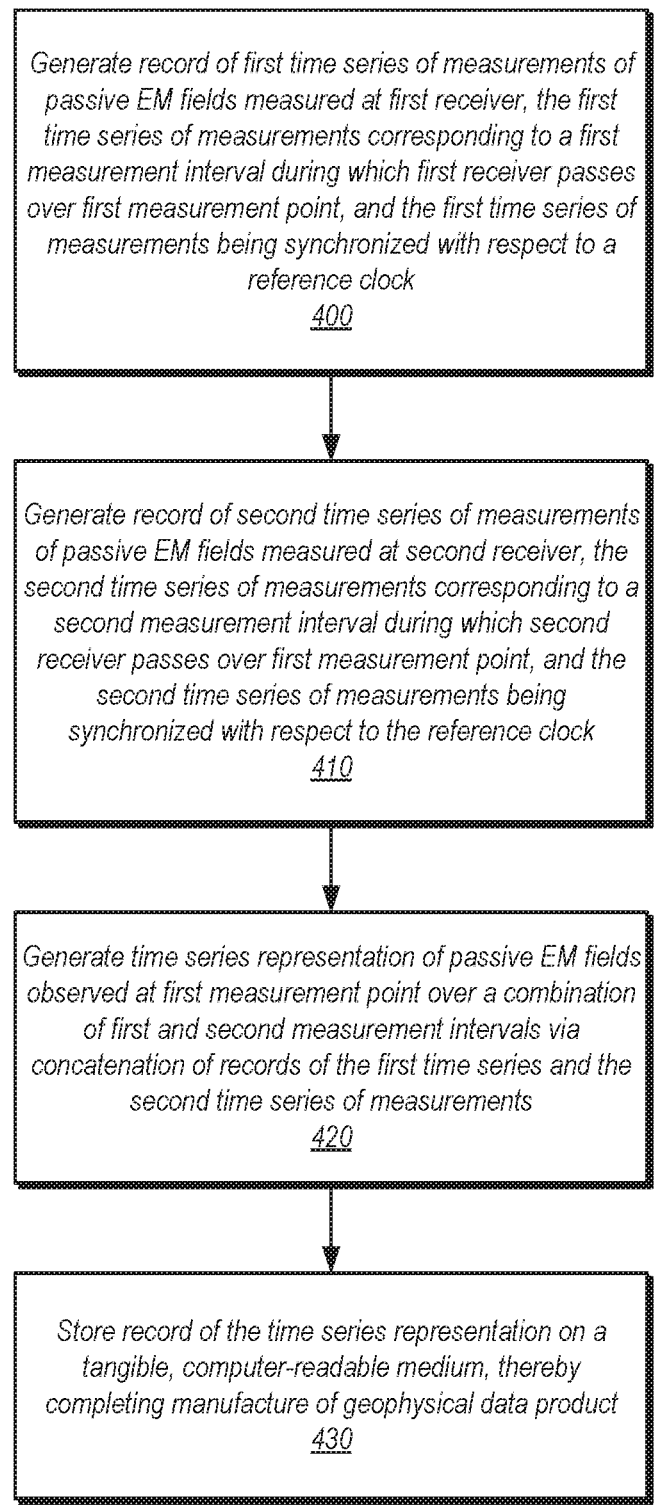
FIG. 4 is a flow diagram illustrating an embodiment of a method for manufacturing a geophysical data product using a towed EM streamer.

In various embodiments, the system of FIG. 1 may be deployed to conduct a MT survey in which the measurements obtained via receivers 130 are indicative of passive EM fields such as the natural geoelectric and/or geomagnetic fields of the Earth. Collectively, FIGS. 2-4 illustrate one example of how such an MT survey may be performed. For purposes of simplifying this example, it is assumed that EM source 122 is inactive or entirely omitted, although later discussion will describe various embodiments in which EM and MT survey techniques may be combined.

Turning first to FIG. 2, a schematic representation of EM streamer 124 is illustrated in profile with respect to a measurement point 200a located on (or just below) the water bottom. Several individual receivers 130a-n are shown. In some embodiments, EM streamer 124 may be on the order of 8-10 km in length and may include on the order of 50-100 receivers 130, although other configurations are possible. In some embodiments, receivers 130 may be grouped into channels such that the measurements of multiple receivers 130 are combined or superimposed within a channel, whereas in other embodiments, there may be a one-to-one correspondence between receivers 130 and channels such that the measurements from each of receivers 130 are separately conveyed to recording system 110. During survey operation, EM streamer 124 may be towed by vessel 105 in the general direction shown. Towing speeds may vary according to water surface conditions and survey objectives but may generally be in the range of 2-6 knots, as one example.

In FIG. 2, receiver 130a is shown approaching measurement point 200a. Turning now to FIGS. 3A, 3B, and 4, survey operation may proceed as follows. As shown in block 400 of FIG. 4, recording system 110 generates a record of a first time series of measurements of passive EM fields measured at a first receiver, where the first time series of measurements corresponds to a first measurement interval during which the first receiver passes over a measurement point, where the first time series of measurements is synchronized with respect to a reference clock.

For example, FIG. 3A shows receiver 130a passing over measurement point 200a during the course of a measurement interval bounded by times $T_1$ and $T_2$. During this interval, receiver 130a may measure the amplitude of passive EM signals in the vicinity of measurement point 200a, which may in turn be recorded by recording system 110. (Here, for simplicity, measurement point 200a is shown as the midpoint of the measurement interval, but as discussed in greater detail below, measurement point 200a could be denoted at the beginning or end of the measurement interval, or any point within the interval.) An arbitrary example of a measurement obtained by receiver 130a over the interval from $T_1$ to $T_2$ is shown at the left of FIG. 3A. While the example amplitude measurement is shown as an effectively continuous signal, it may be recorded as a discrete series of samples at a sampling rate selected based on the frequencies expected to be measured.

It is noted that different measurement intervals may be employed in different embodiments. In one embodiment, the measurement interval may be on the order of 120 seconds. At a typical vessel speed of about 4.5 knots, receiver 130a would be expected to move about 250 meters during the course of this measurement interval.

Generally speaking, the reference clock to which the measurement record is synchronized may be any uniform representation of time, global to all of receivers 130, that can be used to timestamp individual measurements of receivers 130. For example, the reference clock may be derived from signals received from Global Positioning System satellites, from which Coordinated Universal Time (UTC) may be obtained. In general, a reference clock having accuracy and precision suitable for seismic surveying should be more than sufficient for the MT techniques described here.

At block 410 of FIG. 4, recording system 110 generates a record of a second time series of measurements of passive EM fields measured at a second receiver, where the second time series of measurements corresponds to a second measurement interval during which the second receiver passes over the measurement point, where the second time series of measurements is also synchronized with respect to the reference clock.

For example, FIG. 3B shows receiver 130b passing over measurement point 200a during the course of a measurement interval bounded by times $T_2$ and $T_3$. During this interval, receiver 130b may measure the amplitude of passive EM signals in the vicinity of measurement point 200a, which may in turn be recorded by recording system 110. An arbitrary example of a measurement obtained by receiver 130b over the interval from $T_2$ to $T_3$ is shown at the left of FIG. 3B. (In this example, it is assumed that the measurement intervals for receivers 130a and 130b are adjacent in time—i.e., that the measurement interval for receiver 130b begins at the same time that the measurement interval for receiver 130a ends. It is possible, however, that there may be gaps in time between measurement intervals for adjacent receivers 130.)

At block 420 of FIG. 4, recording system 110 generates a time series representation of passive EM fields observed at the first measurement point over a combination of the first and second measurement intervals via concatenation of the records of the first time series and the second time series of measurements. As used herein, "concatenation" of records of time-series data refers to a general process of appending the records to one another in a manner that produces a longer record of time-series data that, in turn, preserves the temporal ordering of data points in the concatenated records. It is not necessary that every data point in the original records appear in the concatenated result; in various embodiments, filtering, normalization, interpolation, or other types of transformation may be employed in the process of concatenation, e.g., in order to reduce noise or the potential for discontinuities, particularly at boundaries of concatenated records.

Figure 5:
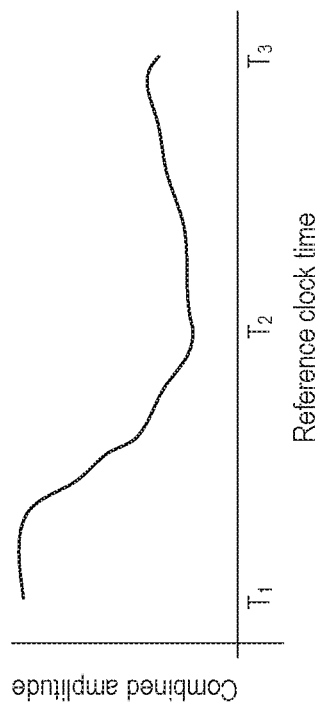
FIG. 5 illustrates an example of how measurement records obtained by different receivers may be combined into a single time series representation of passive EM field measurements at a measurement point.

Intuitively, the concatenation at block 420 may be understood as the "stitching together" in time of a discrete set of records obtained by multiple receivers 130 to generate a single time series representation of data from the perspective of the measurement point. As a simple example, FIG. 5 shows how the measurement records obtained by receivers 130*a-b*, as shown in FIGS. 3A-B, may be combined into a single time series representation of passive EM field measurements at measurement point 200*a* over the extended time interval from $T_1$ to $T_3$.

Finally, at block 430 of FIG. 4, recording system 110 stores a record of the time series representation on a tangible, computer-readable medium, thereby completing manufacture of a geophysical data product. Some non-limiting examples of computer-readable media may include tape reels, hard drives, CDs, DVDs, flash memory, printouts, etc., although any tangible computer-readable medium may be employed to create the geophysical data product. In some embodiments, raw analog data from streamers may be stored in the computer-readable medium. In other instances, as noted above, the data may first be digitized and/or conditioned prior to being stored in the computer-readable medium. In yet other instances, the data may be fully processed into a two- or three-dimensional map of the various geophysical structures, or another suitable representation, before being stored in the computer-readable medium. The geophysical data product may be manufactured during the course of a survey (e.g., by equipment on a vessel) and then, in some instances, transferred to another location for geophysical analysis, although analysis of the geophysical data product may occur contemporaneously with survey data collection. In other instances, the geophysical data product may be manufactured (or remanufactured) subsequent to survey completion, e.g., during the course of analysis of the survey.

As a result of applying the technique described above, it may be possible to reconstruct the time series of passive EM field measurements that would have been obtained by a water-bottom sensor located at or near measurement point 200*a* with the combined measurements of receivers 130 as they pass measurement point 200*a*. One difference is that because the time series of measurements obtained by a given receiver 130 are recorded while that receiver is moving, those measurements may not correspond exactly to the location of measurement point 200*a*, but rather to a bin size that is defined as a function of, e.g., the measurement interval and the vessel speed.

For example, as noted above, for a measurement interval of 120 seconds and a vessel speed of about 4.5 knots, a given receiver 130 would move approximately 250 meters during the course of capturing a time series record (that is, resulting in a bin size of 250 meters). Because the given receiver 130 is not directly over measurement point 200*a* for the entire measurement interval, some error is introduced relative to the case of statically performing measurements at measurement point 200*a*. However, when the fields being measured vary slowly over time, as is the case with MT surveys, this error may be effectively inconsequential.

In some embodiments, the skin depth relation can be used to estimate the survey resolution and thus the maximum permissible bin size for a particular survey environment. For example, in Borah et al. "Effect of evaluation frequency separation on magnetotelluric resolution," Annals of Geophysics 60:2 G0330 (2017), the maximum permissible bin size is shown to be twice the skin depth (i.e., one skin depth on either side of the receiver). For many geophysical studies, the skin depth can be expressed as $$503 * \sqrt{\frac{\rho}{f}},$$

where $\rho$ is the resistivity in $\Omega m$ and f is the frequency in Hz. At 1 Hz, the skin depth is ~275 meters for a homogenous sea water environment (e.g., having 0.3 $\Omega m$ resistivity) and ~711 meters for a sediment half space (e.g., having 2 $\Omega m$ resistivity, which is typical for marine sediments). Thus for the frequencies of interest in MT surveying, e.g., <1 Hz, the skin depth analysis indicates that a bin size of 250 meters may produce acceptable results.

For simplicity, the survey technique of FIG. 4 is described with respect to two receivers 130*a-b* passing over a single measurement point 200*a*. Numerous other configurations are possible, however. For example, records from any suitable number of receivers 130 may be generated and concatenated to generate a long-period time series representation of measurements observed at measurement point 200*a*.

More specifically, in various embodiments, recording system 110 may be further configured to generate additional record(s) of time series measurements of passive EM fields that are respectively measured at additional receiver(s) 130 during respective measurement intervals during which the additional receiver(s) 130 pass over measurement point 200*a*, where the additional record(s) are also synchronized with respect to the reference clock (e.g., a GPS-derived clock). To generate the time series representation of passive EM fields observed at measurement point 200*a*, recording system 110 may then be configured to concatenate the additional record(s) with the records obtained from receivers 130*a-b*.

Generally speaking, the maximum time period $T_{max}$ of the time series representation that can be constructed using this technique depends on the overall streamer length and vessel speed. For example, for a 10 km streamer towed at 4.5 knots, $T_{max}$ is about 70 minutes. The lowest frequency that can be measured may be given as $1/T_{max}$. Increasing $T_{max}$ through the use of longer streamers or slower vessel speed may enable measurement of lower frequencies of passive EM fields, which in turn may enable deeper depths of subsurface investigation.

Additionally, measurements may be obtained for multiple measurement points 200 in the path of streamer 124. More specifically, recording system 110 may be further configured to generate a time series representation of passive EM fields observed at a plurality of measurement points 200. For a given measurement point 200, generation of the time series representation may include concatenation of respective records of time series measurements measured at one or more receivers 130 as the receiver(s) 130 pass over the given measurement point 200.

Figure 6:
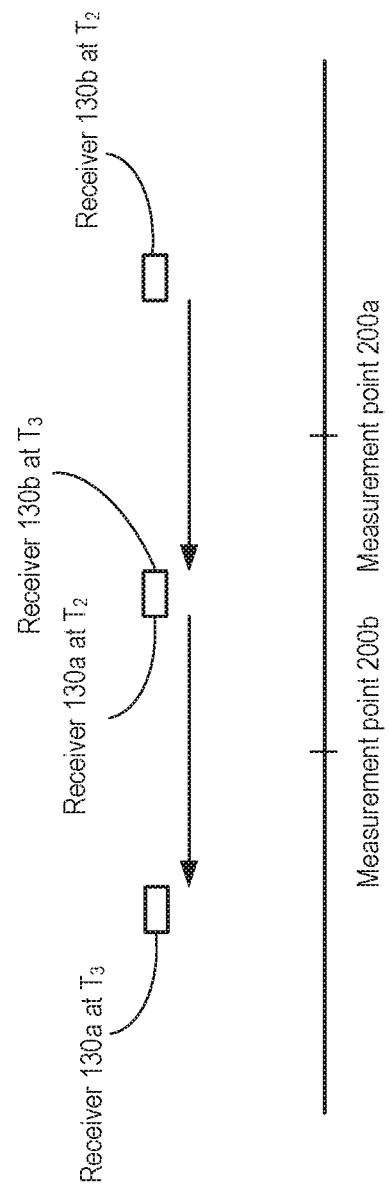
FIG. 6 illustrates an example of how multiple receivers can be deployed over multiple measurement points.

FIG. 6 illustrates an example of how the two receivers 130*a-b* shown in FIGS. 3A-B can be deployed to multiple measurement points 200*a-b*. Specifically, while receiver 130*b* passes over measurement point 200*a* during the measurement interval from $T_2$ to $T_3$, at the same time, receiver 130*a* may pass over measurement point 200*b*, capturing a measurement record over that point. This may, of course, be generalized to any suitable number of measurement points 200.

The survey system shown in FIG. 1 is not necessarily limited to a single EM streamer 124. In some embodiments, vessel 105 may be configured to tow one or more additional EM streamers 124 having respective receivers 130 distributed therealong. Recording system 110 may then be configured to concatenate records of time series measurements of passive EM fields obtained by multiple receivers of the additional EM streamer(s) 124 to generate a time series representation of passive EM fields observed at an additional measurement point in a path of the additional EM streamer(s) 124. Such additional measurement points may be located at crossline offsets relative to measurement points 200*a-b*.

It is also possible to collect both seismic and EM measurements. For example, in various embodiments, one or more seismic sensors may be distributed along either EM streamer 124 or a different streamer configured to be towed by vessel 105 (or, for that matter, a different vessel). Vessel 105 or a different vessel may also tow a seismic energy source, such as an airgun or vibrator, that imparts seismic energy to the subsurface. Recording system 110 may then be configured to generate a record of seismic data measured at the seismic sensor(s) in addition to the EM field measurements discussed above.

In the foregoing discussion, it was assumed for simplicity that passive EM field data was being gathered while EM source 122 was either inactive or omitted—i.e., that purely MT survey data was being gathered. In other embodiments, however, the system of FIG. 1 may be configured to generate MT survey data during the course of performing an active EM survey. In a particular embodiment, EM source 122 may be configured to be active during a first mode of system operation and inactive during a second mode of system operation, and the first and second modes may alternate while EM streamer 124 is towed through the water. During the first mode of operation (i.e., while EM source 122 is active), recording system 110 may be configured to generate a record of active EM survey data. During the second mode of operation (i.e., while EM source 122 is inactive), recording system 110 may be configured to generate records of the time series measurements of passive EM fields discussed above.

As an example, a 120-second repeated cycle may be used in which the first 100 seconds corresponds to the first, active mode of operation and the last 20 seconds corresponds to the second, passive mode of operation, although other configurations of the mode lengths and the total length of the operation cycle may be employed. It is noted that the resulting measurements of passive EM fields may be discontinuous in time. Even with these discontinuities, however, the overall sampling rate may still be more than sufficient to capture useful measurements when measuring very low frequencies like those typically present in MT fields. The discontinuities in passive field measurement may be interpolated or otherwise accounted for using appropriate signal processing techniques.

In another embodiment, EM source 122 may be continuously active during performance of an active EM survey, and to generate the records of time series measurements of passive EM fields, recording system 110 may be configured to extract passive EM field data from the active EM field data obtained during the active EM survey. For example, it is common to apply noise reduction techniques to raw EM survey data in order to remove what is considered "noise" and recover the data that is correlated with the signal generated by EM source 122. The removed data may contain usable MT data, however. Accordingly, in one embodiment, extracting passive EM field data may be performed by first applying noise reduction techniques to raw EM survey data to generate denoised EM survey data, and then subtracting the denoised EM survey data from the raw EM survey data to reconstruct the ambient signal that contains MT data.

Examples of noise reduction techniques may be found in Mattson et al., "Noise Reduction and Error Analysis for a Towed EM System," Society of Exploration Geophysicists, Proceedings of the 2012 SEG Annual Meeting, 4-9 Nov. 2012. Any suitable techniques may be employed, however.

Figure 7:
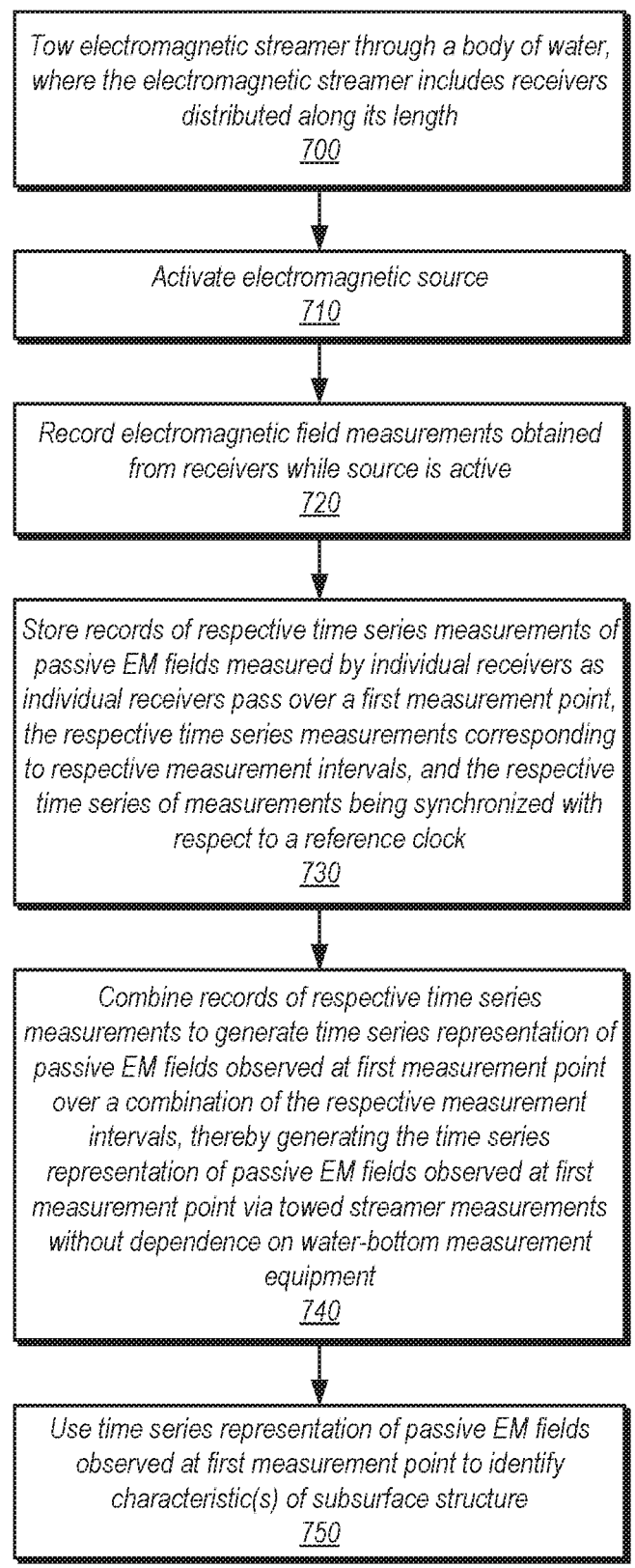
FIG. 7 is a flow diagram illustrating an embodiment of a method of performing an EM survey that includes both active and passive EM field measurements.

FIG. 7 illustrates a particular embodiment of a method of performing an EM survey that includes both active and passive EM field measurements. Operation begins in block 700 with towing an EM streamer through a body of water, where the EM streamer includes a plurality of receivers distributed along its length. For example, EM streamer 124 having receivers 130 may be towed as discussed above.

At block 710, an EM source is activated, and at block 720, EM field measurements obtained from the plurality of receivers are recorded while the EM source is active. For example, while EM source 122 is energized, recording system 110 may record measurements obtained via receivers 130. In some embodiments, seismic measurements may also be obtained from seismic sensors located either along EM streamer 124 or a different streamer being towed concurrently with EM streamer 124.

At block 720, records are stored of respective time series measurements of passive EM fields measured by individual ones of the receivers as the individual receivers pass over a first measurement point, where the respective time series measurements correspond to respective measurement intervals, and where the respective time series measurements are synchronized with respect to a reference clock. For example, recording system 110 may record passive EM field measurements for individual receivers 130 as they pass over a measurement point 200 during their corresponding measurement intervals, in a manner similar to that discussed above with respect to FIGS. 2-4. As noted above, the individual records may be synchronized to a reference clock that is derived from GPS data or another suitable synchronization source.

As discussed above, storing the records of time series measurements of passive EM fields may occur in any of several ways with respect to the storage of records of active EM fields. In some embodiments, the EM source may be deactivated prior to obtaining the records of respective time series measurements of passive EM fields measured by individual ones of the plurality of receivers. For example, the survey system may alternate between modes of active and passive field measurement as previously described. In other embodiments, passive EM field data may be extracted from the EM field measurements obtained from the plurality of receivers while the EM source is active. For example, noise reduction techniques may be applied to the raw active EM measurements to recover the ambient signal containing passive field data as discussed previously.

At block 730, the records of the respective time series measurements are combined to generate a time series representation of passive EM fields observed at the first measurement point over a combination of the respective measurement intervals, thereby generating the time series representation of passive EM fields observed at the first measurement point via towed streamer measurements without dependence on water-bottom measurement equipment. For example, the measurements obtained by each of several receivers 130 may be concatenated as described above with respect to FIGS. 2-4 to generate long-period time series data observed at a given measurement point 200.

At block 740, the time series representation of passive EM fields observed at the first measurement point is used to identify one or more characteristics of subsurface structure.

For example, as discussed above, an inversion procedure may be applied to the time series representation to generate a resistivity profile that describes how resistivity of the subsurface varies with depth, which may in turn be useful in identifying particular subsurface structures such as, e.g., hydrocarbon deposits.

As discussed above with respect to FIG. 4, it is noted that the method of FIG. 7 may be extended to encompass an arbitrary number of receivers 130, measurement points 200, and/or EM streamers 124.

In the foregoing discussion, the techniques for generating a time series representation of passive EM fields have been described in conjunction with performance of a survey. In some embodiments, however, the combination of records from individual receivers 130 to generate a time series representation of fields observed at a measurement point may be performed on survey data after a survey is complete, possibly at a location remote from the survey location.

Figure 8:
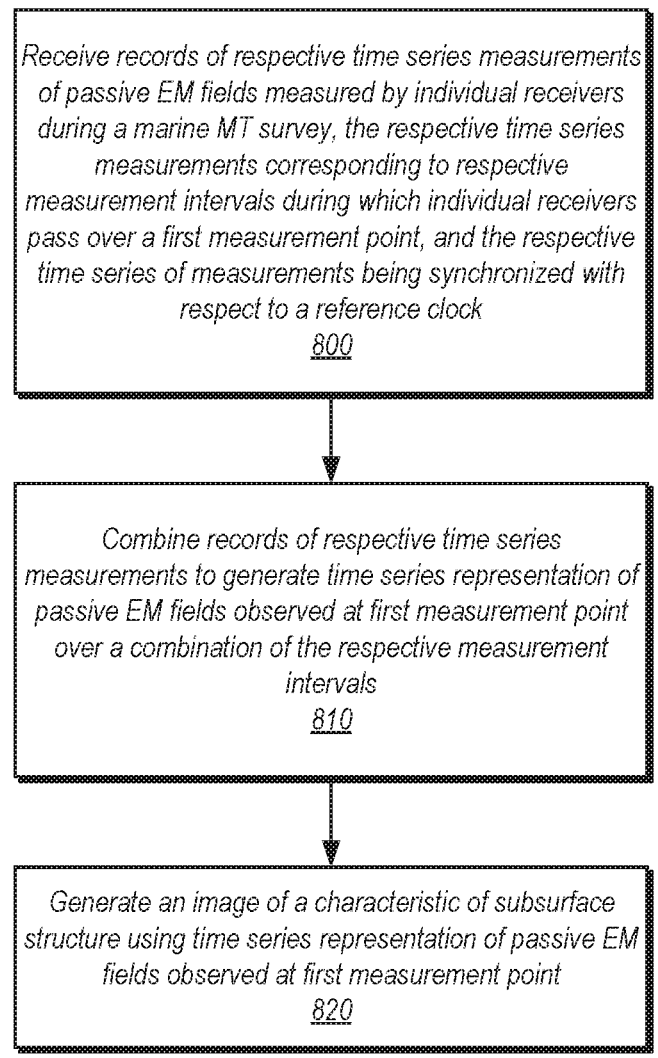
FIG. 8 is a flow diagram illustrating another embodiment of a method of generating long-period time series representations of passive EM fields.

FIG. 8 illustrates one such embodiment of a method that could be performed either during or after a survey. Operation begins in block 800 with receiving records of respective time series measurements of passive EM fields measured by individual ones of a plurality of receivers during a marine magnetotelluric (MT) survey, wherein the respective time series measurements correspond to respective measurement intervals during which the individual receivers pass over a first measurement point, and wherein the respective time series measurements are synchronized with respect to a reference clock.

In some embodiments, the records of respective time series measurements of passive EM fields may be received from receivers 130 during performance of a marine MT survey, for example while a streamer is being towed past measurement point(s) 200. In other embodiments, these records instead may be received from a storage device following completion of the marine MT survey. For example, during the survey, the records may be stored onto a non-transitory machine-readable medium to generate a geophysical data product as discussed above. Subsequently, the geophysical data product may be transported to a different site for further analysis.

Additionally, in some embodiments, the records of respective time series measurements of passive EM fields may be received as individual, time-limited data records defined by the measurement interval. For example, during a survey, recording system 110 may generate a discrete record for a given receiver 130 as it passes over a given measurement point 200, and then generate a different record for the given receiver 130 as it passes over a different measurement point 200. In other embodiments, however, recording system 110 may record a continuous time series of data measured by given receiver 130 during the course of a marine MT survey. In such embodiments, receiving the records of respective time series measurements for given receiver 130 may include extracting, from the continuous time series of data, a subset of data corresponding to a respective measurement interval during which given receiver 130 passed over a particular measurement point 200. In other words, when data is well synchronized to a common reference clock, it may be possible to "snip" individual records for a given measurement point from a continuous time series of data after the fact, rather than generating such records discretely during surveying.

At block 810, the records of the respective time series measurements are combined to generate a time series representation of passive EM fields observed at the first measurement point over a combination of the respective measurement intervals. Such a combination may be performed in a similar manner to that discussed above with respect to FIGS. 2-5. As noted previously, this technique may be applied to an arbitrary number of measurement points 200. Also, in some embodiments, the records of respective time series measurements of passive EM fields may be combined with measurements of active EM fields. Accordingly, prior to combining the records, the respective time series measurements of passive EM fields may be separated from the measurements of active EM fields. For example, the noise reduction techniques mentioned above may be employed to extract an ambient signal that includes the passive EM fields from raw data of active EM field measurements.

At block 820, an image of a characteristic of subsurface structure is generated using the time series representation of passive EM fields observed at the first measurement point. For example, an inversion procedure may be performed using the time series representation to generate a subsurface resistivity profile, as mentioned previously. The resulting resistivity profile forms an image that can be displayed on a display device to visualize subsurface structure, although it is noted that generating the image does not necessarily require displaying the image.

Example Computing System

Various operations described herein may be implemented by a computing device configured to execute program instructions that specify the operations. Similarly, various operations may be performed by circuitry designed or configured to perform the operations. In some embodiments, a non-transitory computer-readable medium has program instructions stored thereon that are capable of causing various operations described herein. As used herein, the term "processor," "processing unit," or "processing element" refers to various elements or combinations of elements configured to execute program instructions. Processing elements include, for example, circuits such as an ASIC (Application Specific Integrated Circuit), custom processing circuits or gate arrays, portions or circuits of individual processor cores, entire processor cores, individual processors, programmable hardware devices such as a field programmable gate array (FPGA) or the like, and/or larger portions of systems that include multiple processors, as well as any combinations thereof.

Figure 9:
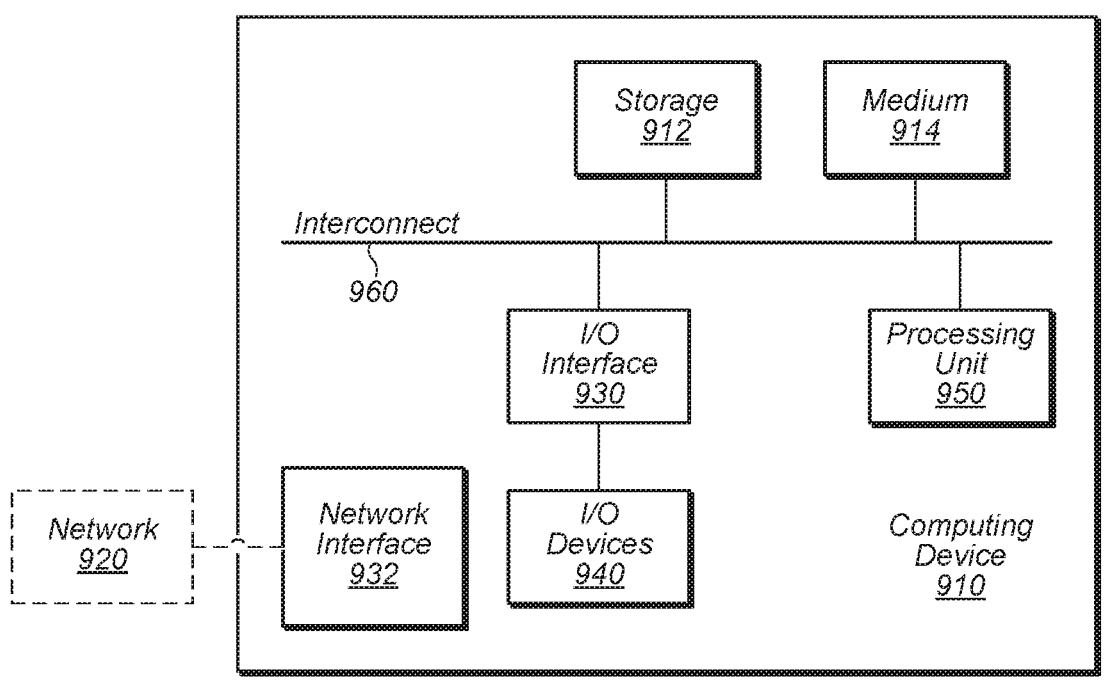
FIG. 9 shows a block diagram illustrating an example computing system.

Turning now to FIG. 9, a block diagram of a computing device (which may also be referred to as a computing system) 910 is depicted, according to some embodiments. Computing device 910 may be used to implement various portions of this disclosure. Computing device 910 is one example of a device that may be used as a mobile device, a server computing system, a client computing system, or any other computing system implementing portions of this disclosure. It is noted that in various configurations, computing system 910, when programmed to perform a specific algorithm, may constitute a means for performing a function for which the specific algorithm is a corresponding structure.

Computing device 910 may be any suitable type of device, including, but not limited to, a personal computer system, desktop computer, laptop or notebook computer, mobile phone, mainframe computer system, web server, workstation, or network computer. As shown, computing device 910 includes processing unit 950, storage subsystem 912, and input/output (I/O) interface 930 coupled via interconnect 960 (e.g., a system bus). I/O interface 930 may be coupled to one or more I/O devices 940. Computing device 910 further includes network interface 932, which may be coupled to network 920 for communications with, for example, other computing devices.

As described above, processing unit 950 includes one or more processors. In some embodiments, processing unit 950 includes one or more coprocessor units. In some embodiments, multiple instances of processing unit 950 may be coupled to interconnect 960. Processing unit 950 (or each processor within processing unit 950) may contain a cache or other form of on-board memory. In some embodiments, processing unit 950 may be implemented as a general-purpose processing unit, and in other embodiments it may be implemented as a special purpose processing unit (e.g., an ASIC). In general, computing device 910 is not limited to any particular type of processing unit or processor subsystem.

Storage subsystem 912 is usable by processing unit 950 (e.g., to store instructions executable by and data used by processing unit 950). Storage subsystem 912 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 912 may consist solely of volatile memory in some embodiments. Storage subsystem 912 may store program instructions executable by computing device 910 using processing unit 950, including program instructions executable to cause computing device 910 to implement the various techniques disclosed herein, and in particular, any of the methods described above along with suitable variants thereof. In at least some embodiments, storage subsystem 912 may represent an example of a non-transitory computer-readable medium that may store executable instructions.

In the illustrated embodiment, computing device 910 further includes non-transitory medium 914 as a possibly distinct element from storage subsystem 912. For example, non-transitory medium 914 may include persistent, tangible storage such as disk, nonvolatile memory, tape, optical media, holographic media, or other suitable types of storage. In some embodiments, non-transitory medium 914 may be employed to store and transfer geophysical data, and may be physically separable from computing device 910 to facilitate transport. Accordingly, in some embodiments, the geophysical data product discussed above may be embodied in non-transitory medium 914. Although shown to be distinct from storage subsystem 912, in some embodiments, non-transitory medium 914 may be integrated within storage subsystem 912. Embodiments of non-transitory medium 914 and/or storage subsystem 912 may correspond to a means for storing recorded seismic data.

I/O interface 930 may represent one or more interfaces and may be any of various types of interfaces configured to couple to and communicate with other devices, according to various embodiments. In some embodiments, I/O interface 930 is a bridge chip from a front-side to one or more back-side buses. I/O interface 930 may be coupled to one or more I/O devices 940 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.). In some embodiments, the one or more of I/O devices 940 may constitute the computer-readable medium used to manufacture a geophysical data product, as discussed above.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "apparatus configured to traverse a streamer" is intended to cover, for example, a mechanism that performs this function during operation, even if the mechanism in question is not currently being used (e.g., a power supply is not connected to it, or no streamer is currently present). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function, and may, after programming, be "configured to" perform that function.

Reciting in the appended claims that a structure is "configured to" perform one or more tasks is expressly intended not to invoke 35 U.S.C. § 112(f) for that claim element. Only those claims expressly using the "means for [performing a function]" construct are intended to invoke Section 112(f) for that claim element.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents (such as "one or more" or "at least one") unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Moreover, where flow charts or flow diagrams are used to illustrate methods of operation, it is specifically contemplated that the illustrated operations and their ordering demonstrate only possible implementations and are not intended to limit the scope of the claims. It is noted that alternative implementations that include more or fewer operations, or operations performed in a different order than shown, are possible and contemplated.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure. Although various advantages of this disclosure have been described, any particular embodiment may incorporate some, all, or even none of such advantages.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims, and features from respective independent claims may be combined in any appropriate manner and not merely in the specific combinations enumerated in the appended claims.

What is claimed is:

1. A system, comprising:
   an electromagnetic (EM) streamer that includes a plurality of receivers distributed along its length;
   a vessel configured to tow the EM streamer through a body of water over a first measurement point; and
   a recording system configured to:
   generate a record of a first time series of measurements of passive EM fields measured at a first one of the receivers, wherein the first time series of measurements corresponds to a first measurement interval during which the first receiver passes over the first measurement point, wherein the first time series of measurements is synchronized with respect to a reference clock;
   generate a record of a second time series of measurements of passive EM fields measured at a second one of the receivers, wherein the second time series of measurements corresponds to a second measurement interval during which the second receiver passes over the first measurement point, wherein the second time series of measurements is synchronized with respect to the reference clock; and
   generate a time series representation of passive EM fields observed at the first measurement point over a combination of the first and second measurement intervals via concatenation of the records of the first time series and the second time series of measurements.

2. The system of claim 1,
   wherein the recording system is further configured to generate one or more additional records of time series measurements of passive EM fields respectively measured at one or more additional receivers during respective measurement intervals during which the one or more additional receivers pass over the first measurement point, wherein the one or more additional records of time series measurements are synchronized with respect to the reference clock; and
   wherein to generate the time series representation of passive EM fields observed at the first measurement point, the recording system is further configured to concatenate the one or more additional records of time series measurements with the records of the first and second time series of measurements.

3. The system of claim 1, wherein the recording system is further configured to generate a time series representation of passive EM fields observed at a plurality of measurement points, wherein for a given one of the plurality of measurement points, generation of the time series representation includes concatenation of respective records of time series measurements measured at one or more of the receivers as the one or more of the receivers pass over the given measurement point.

4. The system of claim 1,
   wherein the vessel is further configured to tow an additional EM streamer including a respective plurality of receivers distributed along its length; and
   wherein the recording system is further configured to concatenate records of time series measurements of passive EM fields obtained by multiple receivers of the additional EM streamer to generate a time series representation of passive EM fields observed at an additional measurement point in a path of the additional EM streamer.

5. The system of claim 1, further comprising an EM source configured to be active during a first mode of system operation and inactive during a second mode of system operation, wherein the first and second mode of system operation are configured to alternate while the EM streamer is towed through the body of water;
   wherein during the first mode of system operation, the recording system is configured to generate a record of active EM survey data; and
   wherein the first and second time series measurements of passive EM fields are obtained during the second mode of system operation.

6. The system of claim 1, further comprising an EM source configured to be continuously active during performance of an active EM survey, wherein to generate the records of the first and second time series measurements of passive EM fields, the recording system is further configured to extract passive EM field data from active EM survey data obtained during performance of the active EM survey.

7. The system of claim 1, further comprising one or more seismic sensors located either along the EM streamer or along a different streamer configured to be towed by the vessel, wherein the recording system is further configured to generate a record of seismic data measured at the one or more seismic sensors.

8. In a method of performing an active electromagnetic (EM) survey comprising:
   towing an EM streamer through a body of water, wherein the EM streamer includes a plurality of receivers distributed along its length;
   activating an EM source; and
   recording EM field measurements obtained from the plurality of receivers while the EM source is active;
   the specific improvement comprising:
   storing records of respective time series measurements of passive EM fields measured by individual ones of the plurality of receivers as the individual receivers pass over a first measurement point, wherein the respective time series measurements correspond to respective measurement intervals, and wherein the respective time series measurements are synchronized with respect to a reference clock;

combining the records of the respective time series measurements to generate a time series representation of passive EM fields observed at the first measurement point over a combination of the respective measurement intervals, thereby generating the time series representation of passive EM fields observed at the first measurement point via towed streamer measurements in conjunction with performance of an active EM survey and without dependence on water-bottom measurement equipment; and using the time series representation of passive EM fields observed at the first measurement point to identify one or more characteristics of subsurface structure.

9. The method of claim 8, wherein storing records of respective time series measurements of passive EM fields measured by individual ones of the plurality of receivers comprises extracting passive EM field data from the EM field measurements obtained from the plurality of receivers while the EM source is active.

10. The method of claim 8, further comprising deactivating the EM source prior to obtaining the records of respective time series measurements of passive EM fields measured by individual ones of the plurality of receivers.

11. The method of claim 8, wherein the passive EM fields include components having frequencies below 1 Hz.

12. The method of claim 8, wherein the reference clock is derived from received Global Positioning System (GPS) data.

13. The method of claim 8, further comprising recording seismic measurements from a plurality of seismic sensors located either along the EM streamer or along a different streamer towed concurrently with the EM streamer.

14. A non-transitory machine-readable medium that stores instructions, wherein the instructions are executable by one or more processors to perform operations comprising:

receiving records of respective time series measurements of passive electromagnetic (EM) fields measured by individual ones of a plurality of receivers during a marine magnetotelluric (MT) survey, wherein the respective time series measurements correspond to respective measurement intervals during which the individual receivers pass over a first measurement point, and wherein the respective time series measurements are synchronized with respect to a reference clock;

combining the records of the respective time series measurements to generate a time series representation of passive EM fields observed at the first measurement point over a combination of the respective measurement intervals; and generating an image of a characteristic of subsurface structure using the time series representation of passive EM fields observed at the first measurement point.

15. The non-transitory machine-readable medium of claim 14, wherein the records of respective time series measurements of passive EM fields are received from a storage device following completion of the marine MT survey.

16. The non-transitory machine-readable medium of claim 14, wherein the records of respective time series measurements of passive EM fields are received during performance of the marine MT survey.

17. The non-transitory machine-readable medium of claim 14, wherein for a given one of the plurality of receivers, receiving a record of respective time series measurements of passive EM fields measured by the given receiver includes:

receiving a continuous time series of data measured by the given receiver during the marine MT survey; and extracting, from the continuous time series of data, a subset of data corresponding to the respective measurement interval during which the given receiver passed over the first measurement point.

18. The non-transitory machine-readable medium of claim 14, wherein the records of respective time series measurements of passive EM fields are combined with measurements of active EM fields, and wherein the operations further comprise separating the respective time series measurements of passive EM fields from the measurements of active EM fields prior to combining the records of the respective time series measurements.

19. The non-transitory machine-readable medium of claim 14, wherein generating the image of the characteristic of subsurface structure comprises performing an inversion procedure on the time series representation to generate a subsurface resistivity profile.

20. A method for manufacturing a geophysical data product, comprising:

generating a record of a first time series of measurements of passive electromagnetic (EM) fields measured at a first one of a plurality of receivers, wherein the plurality of receivers is distributed along the length of an EM streamer towed through a body of water over a first measurement point, wherein the first time series of measurements corresponds to a first measurement interval during which the first receiver passes over the first measurement point, wherein the first time series of measurements is synchronized with respect to a reference clock;

generating a record of a second time series of measurements of passive EM fields measured at a second one of the receivers, wherein the second time series of measurements corresponds to a second measurement interval during which the second receiver passes over the first measurement point, wherein the second time series of measurements is synchronized with respect to the reference clock;

generate a time series representation of passive EM fields observed at the first measurement point over a combination of the first and second measurement intervals via concatenation of the records of the first time series and the second time series of measurements; and storing a record of the time series representation on a tangible, computer-readable medium, thereby completing manufacture of the geophysical data product.

21. The method of claim 20, further comprising:

generating one or more additional records of time series measurements of passive EM fields respectively measured at one or more additional receivers during respective measurement intervals during which the one or more additional receivers pass over the first measurement point, wherein the one or more additional records of time series measurements are synchronized with respect to the reference clock;

wherein generating the time series representation of passive EM fields observed at the first measurement point comprises concatenating the one or more additional records of time series measurements with the records of the first and second time series of measurements.

22. The method of claim 20, further comprising:
generating a time series representation of passive EM fields observed at a plurality of measurement points, wherein for a given one of the plurality of measurement points, generating the time series representation comprises concatenating respective records of time series measurements measured at one or more of the receivers as the one or more of the receivers pass over the given measurement point.

23. The method of claim 20, further comprising:
concatenating records of time series measurements of passive EM fields obtained by multiple receivers of an additional EM streamer to generate a time series representation of passive EM fields observed at an additional measurement point in a path of the additional EM streamer.

24. The method of claim 20, further comprising:
during a first mode of operation in which an EM source is active, generating a record of active EM survey data; and
wherein the first and second time series measurements of passive EM fields are obtained during a second mode of operation in which the EM source is inactive.

25. The method of claim 20, wherein generating the records of the first and second time series measurements of passive EM fields comprises extracting passive EM field data from active EM survey data obtained during performance of an active EM survey.

26. The method of claim 20, further comprising generating a record of seismic data measured at one or more seismic sensors located with along the EM streamer or along a different streamer.

27. A system, comprising:
towed means for measuring passive electromagnetic (EM) fields in a body of water;
means for storing respective time series measurements of passive EM fields corresponding to a single measurement point, the respective time series measurements corresponding to respective measurement intervals;
means for combining the respective time series measurements of passive EM fields to generate a time series representation of passive EM fields observed at the single measurement point over a combination of the respective measurement intervals; and
means for storing the time series representation of passive EM fields observed at the single measurement point.

* * * * *